May 28, 1929.  B. GROSSBARD  1,714,775
ADJUSTABLE TRANSMISSION APPLIANCE
Filed Dec. 24, 1927
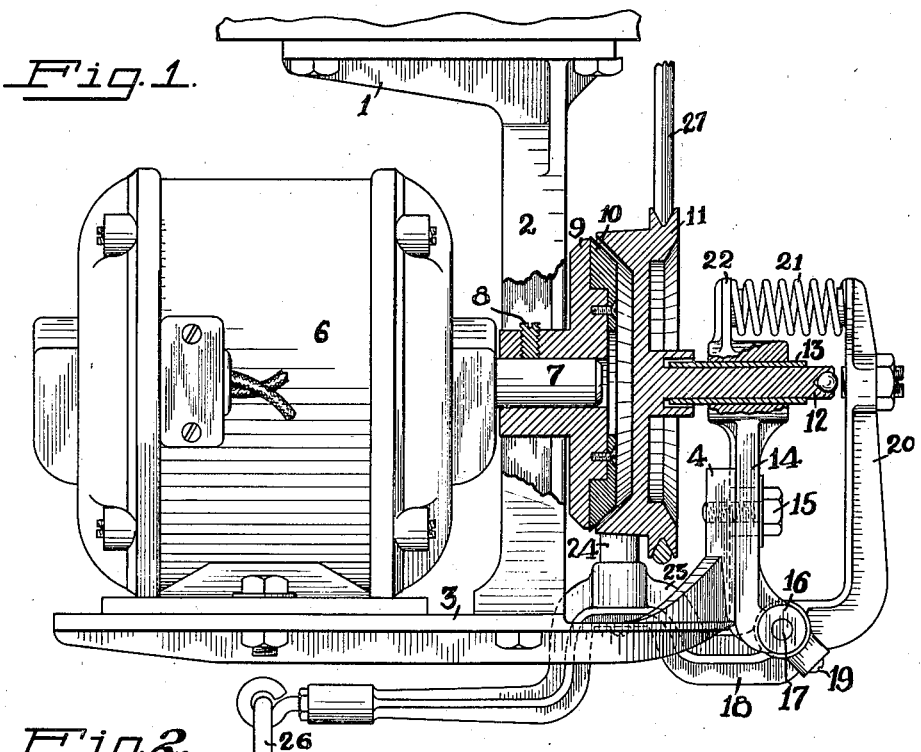
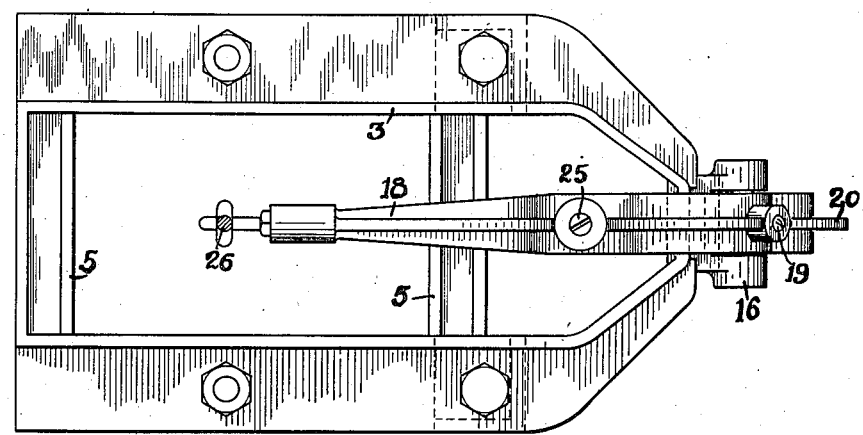
INVENTOR.
BARNET GROSSBARD
BY
J.E. Trabucco
ATTORNEY.

Patented May 28, 1929.

1,714,775

UNITED STATES PATENT OFFICE.

BARNET GROSSBARD, OF SAN FRANCISCO, CALIFORNIA.

ADJUSTABLE TRANSMISSION APPLIANCE.

Application filed December 24, 1927. Serial No. 242,428.

This invention relates to improvements in adjustable transmission appliances of the kind used for transmitting power from a power-driven shaft to a mechanism to be operated.

An object of my invention is to provide a transmission appliance wherein is embodied a construction adapted to be adjusted to properly fit motors of various sizes.

Another object of my invention is to provide an adjustable transmission appliance which may be conveniently attached to motors of various sizes and used in connection therewith to transmit power to mechanisms to be operated.

Another object of my invention is to provide an adjustable transmission appliance wherein is embodied a construction adapted to support a motor.

In the accompanying drawings showing the preferred embodiment of my invention,

Fig. 1 is a side view of a transmission appliance showing a part thereof broken away and the clutch mechanism in cross section; and Fig. 2 is a bottom view of the motor supporting part of the appliance.

Referring to the drawings, the numeral 1 represents a top member attachable by bolts or screws to the supporting structure of a machine to be operated. The top member is provided with a pair of downwardly disposed legs 2, which assume the shape of an inverted U. The legs are attached at their ends by bolts or screws to two horizontally disposed supports 3, two adjacent ends of which meet and terminate in an upwardly extending member 4. The supports 3 are each secured to connecting pieces 5 which serve to maintain the free ends of the supports in a fixed position in relation to each other.

Resting on the supports 3 and attached thereto as by bolts is a motor 6, which is provided with a shaft 7. Detachably secured to the shaft 7 as by a set screw 8 is a wheel 9, which has a plurality of beveled gripping pads 10 secured as by screws to the inside surface thereof at points adjacent its periphery. Adjustably supported adjacent the wheel 9 and adapted to contact with the gripping pads 10 is a fly wheel 11 having an extension 12 projecting from its central part. The extension 12 is revolvably located inside a bushing 13, and the bushing, extension and fly wheel are adjustably supported on the upwardly extending member 4 by a bar 14. The bar 14 is provided with a vertically disposed slot, and a screw 15 extends through the latter and enters a threaded hole located in the member 4, thereby providing adjustable means for lowering or raising the fly wheel 11 to position it in the proper operating position for motors of different sizes.

The bar 14 is provided at its lower end with two separated projections 16, and pivotally attached to the projections as by a pin 17 is a lever member 18. A set screw 19 extending into the lever member and against the pin 17 serves to prevent the latter from becoming detached from the projections 16.

The lever member is provided with an upwardly extending part 20 which serves as a means for moving the fly wheel 11 toward and against the gripping pads 10. A spiral spring 21 located between a projecting part 22 of the bar 14 and the upwardly extending part 20 of the lever member, serves as a means for moving the said part 20 of the lever member away from the extension 12 of the fly wheel, thereby allowing the latter to become disengaged from contact with the gripping pads 10.

The lever member 18 curves upwardly between the supports 3 as at 23, and is provided thereon with a pad 24 which may be adjusted through a set screw 25. The pad 24 serves to stop the rotary motion of the fly wheel 11 by its contact therewith when the horizontally extending part of the lever member 18 is moved upwardly by the pressure of the spring 21 against the upwardly extending part 20.

An operating rod 26 attached to the end of the lever member 18 when pulled downwardly moves the lever member on its pivot, thereby moving the upwardly extending part 20 toward and against the extension 12 of the fly wheel 11. The fly wheel 11 upon thus being moved against the gripping pads 10 enables the rotated wheel 9 to actuate the fly wheel, the latter thereby transmitting power through a belt 27 to the mechanism to be operated.

It will be noticed that by adjusting the bar 14 on the upwardly extending member 4 through the screw 15, the fly wheel 11, the lever member 18, the pad 24, and the various parts attached to the fly wheel and lever member are moved as a unit, thereby providing a novel transmission construction which can be readily adjusted to fit motors of different sizes.

Having described my invention, what I claim is:

1. A transmission appliance comprising, in combination with a motor provided with a shaft and a wheel, a motor supporting member having a flange thereon and a lever member adjustably attached to the flange, which said lever member carries a fly wheel, a bearing for the fly wheel, a brake mechanism for stopping the fly wheel and means for moving the fly wheel toward the first-mentioned wheel.

2. A transmission appliance comprising, in combination with a motor provided with a shaft and a wheel, a motor supporting member having a flanged part thereon, a bar adjustably attached to the flanged part having a bearing at one end and a pair of projections at its other end, a fly wheel movably located in the bearing and adapted to contact with the first mentioned wheel, and a lever member pivotally attached to the projections of the bar, which said lever member carries a brake for stopping the fly wheel and means for moving the fly wheel toward the first mentioned wheel.

3. A transmission appliance comprising, in combination with a motor having a shaft and a wheel, a support for the motor, and a lever member adjustably attached to the support, which said lever member carries a rotatable fly wheel adapted to contact with the first-mentioned wheel, a brake mechanism for stopping the rotation of the fly wheel and means for moving the fly wheel toward the first mentioned wheel.

4. A transmission appliance comprising, in combination with a motor having a shaft and wheel, a support for the motor, and means adjustably attached to the support for transmitting power from the wheel to a mechanism, which said means is adjustable as a unit and includes a rotatable fly wheel adapted to contact with the first-mentioned wheel, a belt connecting the fly wheel and the mechanism, a lever for moving the fly wheel into engagement with the first mentioned wheel, a brake for stopping the rotation of the fly wheel and a treadle for manipulating the lever.

5. In a transmission appliance, the combination with a motor having a shaft and a wheel attached thereto, of support for the motor, and a power transmitting means adjustably attached to the support, said means including a rotatable fly wheel adapted to contact with the first mentioned wheel, and a lever for moving the fly wheel into contact with the first mentioned wheel, the said parts of said means being adjustable as a unit on said support.

6. In a transmission appliance, the combination with a motor having a shaft and a wheel attached thereto, of a support for the motor, and a clutch mechanism adjustably attached to the support, including means engageable with the wheel whereby power may be transmitted thereto from the first mentioned wheel, means for moving the first-mentioned means into contact with the wheel, and means for allowing the first-mentioned means to be released from contact with the said wheel, the said parts of the said first mentioned means being adjustable on the said support as a unit.

7. A transmission appliance comprising, in combination with a motor having a shaft and wheel attached thereto, a support for the motor, means attached to the support and adjustable thereon as a unit to fit motors of various sizes, including a fly wheel engageable with the wheel, a lever for moving the fly wheel into contact with the said wheel, a brake for stopping the rotation of the fly wheel, and resilient means for permitting the fly wheel to become disengaged from the said wheel.

8. In a transmission appliance, a motor support, a bar adjustably attached to the support, a wheel movably supported by the bar, and a lever member movably supported by the bar.

9. In a transmission appliance, a motor support, a bar adjustably attached to the support, a wheel revolvably supported by the bar, a lever member pivotally attached to the bar, and resilient means engaging with the lever member for returning the same to its normal position after it has been actuated.

10. In a transmission appliance, a motor support, a bar adjustably attached to the motor support, a lever member pivotally attached to the bar having a spring and a brake member thereon.

11. In a transmission appliance, a motor support, a motor attached to the support having a wheel secured thereto, a bar adjustably attached to the support, a lever member pivotally attached to the bar, and a wheel revolvably supported by the bar, which said wheel is adapted to engage with the first mentioned wheel.

BARNET GROSSBARD.